(12) United States Patent
Lien

(10) Patent No.: US 9,158,541 B2
(45) Date of Patent: Oct. 13, 2015

(54) REGISTER RENAMER THAT HANDLES MULTIPLE REGISTER SIZES ALIASED TO THE SAME STORAGE LOCATIONS

(75) Inventor: Wei-Han Lien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1125 days.

(21) Appl. No.: 12/938,921

(22) Filed: Nov. 3, 2010

(65) Prior Publication Data

US 2012/0110305 A1    May 3, 2012

(51) Int. Cl.
*G06F 9/30* (2006.01)
*G06F 9/38* (2006.01)

(52) U.S. Cl.
CPC .............. *G06F 9/3012* (2013.01); *G06F 9/384* (2013.01)

(58) Field of Classification Search
None
See application file for complete search history.

(56) References Cited

U.S. PATENT DOCUMENTS

| | | | |
|---|---|---|---|
| 5,499,352 A * | 3/1996 | Clift et al. | 712/217 |
| 5,630,149 A * | 5/1997 | Bluhm | 712/217 |
| 5,761,713 A * | 6/1998 | Lesartre | 711/127 |
| 5,974,525 A | 10/1999 | Lin et al. | |
| 6,047,369 A | 4/2000 | Colwell et al. | |
| 6,065,110 A * | 5/2000 | Meltzer et al. | 712/217 |
| 7,428,631 B2 * | 9/2008 | Rupley et al. | 712/217 |
| 7,506,139 B2 | 3/2009 | Burky et al. | |
| 2003/0154419 A1 | 8/2003 | Zang et al. | |
| 2004/0205305 A1 * | 10/2004 | Lee et al. | 711/149 |
| 2008/0016325 A1 * | 1/2008 | Laudon et al. | 712/217 |
| 2010/0153690 A1 | 6/2010 | Vick et al. | |
| 2010/0332805 A1 * | 12/2010 | Blasco Allue et al. | 712/216 |
| 2011/0078414 A1 * | 3/2011 | Olson et al. | 712/208 |
| 2011/0225397 A1 * | 9/2011 | Grisenthwaite et al. | 712/208 |

* cited by examiner

*Primary Examiner* — William B Partridge
(74) *Attorney, Agent, or Firm* — Anthony M. Petro; Meyertons, Hood, Kivlin, Kowert & Goetzel, P.C.

(57) ABSTRACT

A processor may include a physical register file and a register renamer. The register renamer may be organized into even and odd banks of entries, where each entry stores an identifier of a physical register. The register renamer may be indexed by a register number of an architected register, such that the renamer maps a particular architected register to a corresponding physical register. Individual entries of the renamer may correspond to architected register aliases of a given size. Renaming aliases that are larger than the given size may involve accessing multiple entries of the renamer, while renaming aliases that are smaller than the given size may involve accessing a single renamer entry.

18 Claims, 4 Drawing Sheets

Architected Registers

REGISTER RENAMER THAT HANDLES MULTIPLE REGISTER SIZES ALIASED TO THE SAME STORAGE LOCATIONS

BACKGROUND

1. Field of the Invention

This invention is related to the field of processor implementation, and more particularly to techniques for implementing register renaming.

2. Description of the Related Art

Processors typically include a set of programmer-visible registers that provide temporary storage for the operands that are read by instructions as well as the results that are produced by instruction execution. The number and size of the programmer-visible registers is often defined as part of the instruction set architecture (ISA) implemented by the processor. As such, the programmer-visible registers are often referred to as "architected registers." Thus, for example, a particular ISA might define 16 distinct 32-bit registers as being available for use by software.

In order to improve processor performance, many processors map architected registers to a larger set of physical registers using a technique commonly referred to as "register renaming." For example, suppose that an instruction I1 reads the value of an architected register A1, and that an instruction I2 (which follows I1 in program order) writes to the same register A1. Even if I1 and I2 are otherwise independent instructions, I2 cannot correctly execute before I1, because I1 depends on the value of A1 before this register is written by I2. This situation may be referred to as a "write-after-read (WAR) dependency" or "false dependency."

In this example, register renaming may map the instances of A1 referenced by I1 and I2 to two distinct physical registers P1 and P2. Following renaming, I1 may read from physical register P1, whereas I2 writes to physical register P2. Because I2 no longer references storage that I1 depends on, I2 may be permitted to execute concurrently with or prior to I1. Consequently, register naming may improve overall execution performance by increasing the amount of available parallelism in executing code. However, register renaming can be complex to implement in instances where an ISA defines multiple aliases for the same storage location.

SUMMARY

In some embodiments, a processor may include a physical register file and a register renamer. The register renamer may be organized into even and odd banks of entries, where each entry stores an identifier of a physical register. The register renamer may be indexed by a register number of an architected register, such that the renamer maps a particular architected register to a corresponding physical register.

Individual entries of the renamer may correspond to architected register aliases of a given size, such as doubleword registers. In some embodiments, to rename aliases of the given size, the least significant bit of the register number may be used to select either the even or the odd bank, and the remaining bits of the register number may be used to select an entry within the selected bank.

To rename aliases that are larger than the given size, multiple entries of the renamer may be accessed. For example, to rename a quadword register that corresponds to two doubleword registers, an entry from each of the even and odd renamer banks may be accessed.

To rename aliases that are smaller than the given size, a single entry of the renamer may be accessed in a manner similar to that for aliases of the given size. For example, to rename a singleword register in an embodiment where two singleword registers correspond to one doubleword register, a second-to-least significant bit of the singleword register number may be used to select the even or the odd bank, and the remaining more significant bits may be used to select an entry within the selected bank. In some embodiments, false dependencies may be created for the other aliases that decode to the same renamer entry. For example, if one singleword register is renamed, a false dependency may be created for the other singleword register that corresponds to the same doubleword register.

BRIEF DESCRIPTION OF THE DRAWINGS

The following detailed description makes reference to the accompanying drawings, which are now briefly described.

Figure 1:
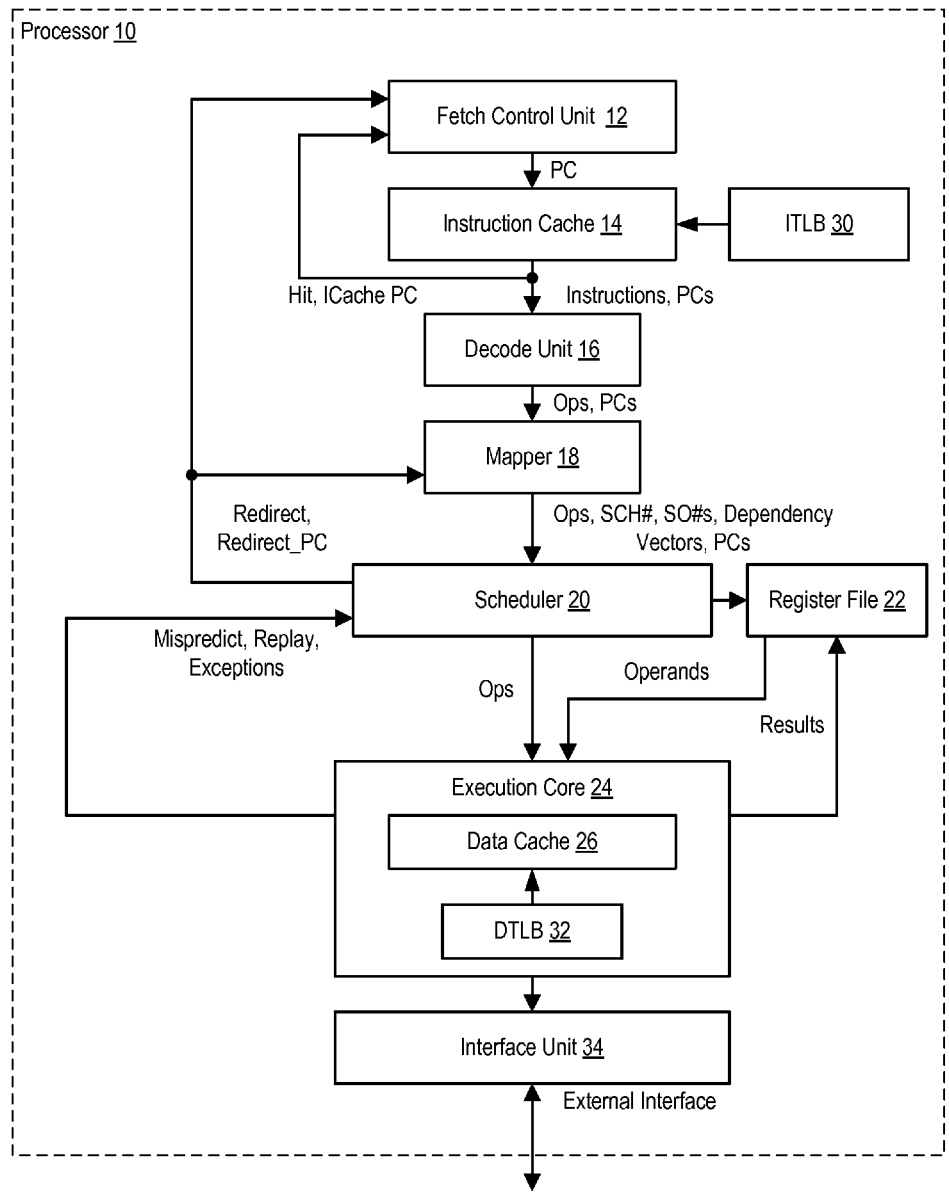
FIG. 1 is a block diagram of an embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Processor Overview

Turning now to FIG. 1, a block diagram of an embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an ICache PC to the fetch control unit 12. The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 24, is coupled to provide a redirect indication and redirect PC to the fetch control unit 12 and the mapper 18, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

Fetch control unit 12 may be configured to generate fetch PCs for instruction cache 14. In some embodiments, fetch control unit 12 may include one or more types of branch predictors. For example, fetch control unit 12 may include indirect branch target predictors configured to predict the target address for indirect branch instructions, conditional branch predictors configured to predict the outcome of conditional branches, and/or any other suitable type of branch predictor. During operation, fetch control unit 12 may generate a fetch PC based on the output of a selected branch predictor. If the prediction later turns out to be incorrect, fetch control unit 12 may be redirected to fetch from a different address. When generating a fetch PC, in the absence of a nonsequential branch target (i.e., a branch or other redirection to a nonsequential address, whether speculative or nonspeculative), fetch control unit 12 may generate a fetch PC as a sequential function of a current PC value. For example, depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently-used virtual-to-physical address translations in a translation lookaside buffer (TLB), such as Instruction TLB (ITLB) 30. During operation, ITLB 30 (which may be implemented as a cache, as a content addressable memory (CAM), or using any other suitable circuit structure) may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In an embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

The execution core 24 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 24 may be configured to execute predicted branch ops, and may receive the predicted target address that was originally provided to the fetch control unit 12. The execution core 24 may be configured to calculate the target address from the operands of the branch op, and to compare the calculated target address to the predicted target address to detect correct prediction or misprediction. The execution core 24 may also evaluate any other prediction made with respect to the branch op, such as a prediction of the branch op's direction. If a misprediction is detected, execution core 24 may signal that fetch control unit 12 should be redirected to the correct fetch target. Other units, such as the scheduler 20, the mapper 18, and the decode unit 16 may flush pending ops/instructions from the speculative instruction stream that are subsequent to or dependent upon the mispredicted branch.

The execution core may include a data cache 26, which may be a cache memory for storing data to be processed by the processor 10. Like the instruction cache 14, the data cache 26 may have any suitable capacity, construction, or line size (e.g. direct mapped, set associative, fully associative, etc.). Moreover, the data cache 26 may differ from the instruction cache 14 in any of these details. As with instruction cache 14, in some embodiments, data cache 26 may be partially or entirely addressed using physical address bits. Correspondingly, a data TLB (DTLB) 32 may be provided to cache virtual-to-physical address translations for use in accessing the data cache 26 in a manner similar to that described above with respect to ITLB 30. It is noted that although ITLB 30 and DTLB 32 may perform similar functions, in various embodiments they may be implemented differently. For example, they may store different numbers of translations and/or different translation information.

The register file 22 may generally include any set of registers usable to store operands and results of ops executed in the processor 10. In some embodiments, the register file 22 may include a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may include an architected register set containing the committed state of the logical registers and a speculative register set containing speculative register state.

The interface unit 24 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In various embodiments, the processor 10 may implement any instruction set architecture.

Register Renaming where ISA Defines Multiple Aliases for the Same Storage

In some embodiments, processor 10 may implement an ISA in which the same storage may be accessible through different register names. For example, processor 10 may implement a version of the ARM™ architecture that supports an arrangement of architected registers such as that illustrated in FIG. 2. In the illustrated embodiment, 64 32-bit registers (also referred to as "singleword" registers) denoted S0-S63 are shown. The same storage that corresponds to singleword registers S0-S63 also may be accessed as 32 64-bit "doubleword" registers denoted D0-D31, or as 16 128-bit "quadword" registers denoted Q0-Q15.

Figure 2:
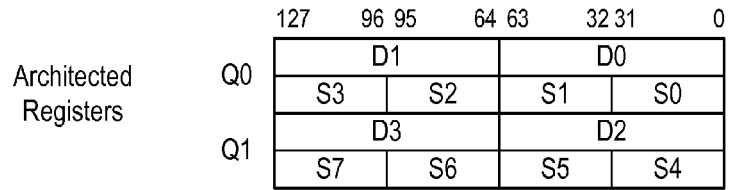
FIG. 2 is a block diagram illustrating a possible arrangement of aliased architected registers, according to an embodiment.

That is, as shown in FIG. 2, a reference to doubleword register D0 identifies the same data as the concatenation of singleword registers S1 and S0. Thus, D0 may be considered an alias for the storage identified by S1 and S0. Similarly, a reference to quadword register Q1 identifies the same data as the concatenation of doubleword registers D3 and D2 as well as the concatenation of singleword registers S7 through S4. Thus, Q1 may be considered an alias for the storage identified by D3 and D2, as well as an alias for the storage identified by S7, S6, S5, and S4.

It is noted that the arrangement shown in FIG. 2 is only one of many possible embodiments in which multiple register name aliases may exist that correspond to the same storage. In other embodiments, any suitable number of aliases may be employed, and the different aliases may have data sizes other than the ones described above. For example, aliases corresponding to 8-bit, 16-bit, or other sizes of registers may be defined. Moreover, regardless of the number of aliases, other embodiments may employ different total amounts of architected storage. For example, an embodiment may implement 128 32-bit architected registers (which also might be accessible, via aliasing, as 64 64-bit registers, 32 128-bit registers, 16 256-bit registers, 256 16-bit registers, and/or any other suitable combination of registers).

Aliases may present additional complexity when implementing register renaming. Consider once again the example of two instructions I1 and I2, where I2 follows I1 in program order, in the context of the register arrangement shown in FIG. 2. Suppose that instruction I1 reads doubleword register D2. If instruction I2 writes to register D2, then a false or WAR dependency exists between I1 and I2 that could be resolved by renaming I2's destination to refer to a physical register that is different from the physical register to which I1's source refers.

However, this is not the only possible WAR dependency scenario in the case of aliasing. For example, if instead of writing to doubleword register D2, I2 writes to any of singleword registers S4 or S5 or quadword register Q1, a WAR dependency would still exist, because each of these registers either partially or completely overlaps with doubleword register D2.

Even in such a scenario, renaming may still be employed to eliminate the WAR dependency and allow I1 and I2 to execute concurrently. For example, if I1 reads register D2 and I2 writes register S4, the WAR dependency may be eliminated by mapping S4 to a different physical register. However, if architected registers are only partially remapped, complex dependency scenarios can result. For example, suppose that instruction I3 follows I2 in program order and reads register D2. Because D2 corresponds to the concatenation of S5 and S4, instruction I3 may have only a partial read-after-write dependency on I2 for the portion of D2 that I2 generates (i.e., the portion that occupies S4). I3 may implicitly depend on some other instruction for the other portion of D2 (i.e., the portion that occupies S5).

However, for instructions that read registers using larger aliases, it may be difficult to detect dependencies for and individually rename each of the smaller aliases that overlap the larger alias. For example, an instruction that reads quadword register Q0 could conceivably have a RAW or WAR dependency with respect to as many as four other instructions for this single operand (i.e., instructions that read or write S0 through S3).

Figure 3:
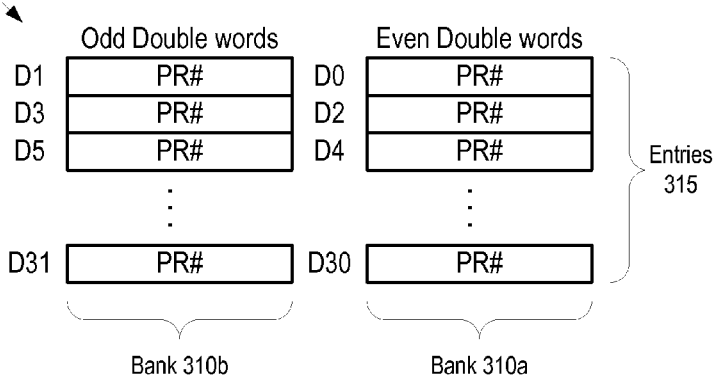
FIG. 3 is a block diagram of an embodiment of a register renamer that may be used in a processor that implements aliased architected registers.

FIG. 3 illustrates an embodiment of a register renamer 300 that may be employed in a processor that supports access to the same register storage through multiple different architected register aliases. For example, in some embodiments, mapper 18 of processor 10 (shown in FIG. 1) may correspond to or include renamer 300, and renamer 300 may be configured to support quadword, doubleword, and singleword registers in a manner similar to that discussed above with respect to FIG. 2. However, in other embodiments, renamer 300 may be used in any suitable type of processor and may support any suitable configuration of registers.

In the illustrated embodiment, renamer 300 is organized into two distinct banks 310a-b, each including a number of entries 315. Each of entries 315 corresponds to a given respective architected register and stores an identifier of a physical register to which the given architected register is mapped. Thus, renamer 300 may essentially function as a circuit structure that indicates the correspondence between the architected registers and the physical registers according to a current renaming scheme. Renaming a particular architected register to a particular physical register may be accomplished by storing the value of the particular physical register's identifier or tag into the appropriate entry 315 corresponding to the particular architected register. Similarly, determining the physical register that corresponds to a particular architected register may be accomplished by reading the value stored in the entry 315 that corresponds to the particular architected register.

It is contemplated that in various embodiments, renamer 300 may be implemented according to any suitable circuit technique. For example, individual entries 315 may correspond to entries of a RAM array that is indexed for reading and writing by a bit field that identifies individual architected registers, although other types of state elements may also be employed. In some embodiments, renamer 300 may be implemented in a multi-ported fashion, such that different entries 315 may be concurrently read and/or written. In some embodiments, renamer 300 may include state information (e.g., valid bits) that indicate whether a particular entry 315 contains valid data, while in other embodiments, such renamer state information may be maintained separately.

As noted above with respect to mapper 18, the renaming information maintained by renamer 300 may be accompanied by or augmented with other information for the purpose of detecting dependencies and scheduling execution of instructions. For example, mapper 18 may assign a particular scheduler entry to an operation and generate dependency vectors for the operation based on schedule entry and/or register number information.

In the specific configuration shown in FIG. 3, renamer 300 is organized such that each of entries 315 corresponds to a particular one of doubleword registers D0-D31. Moreover, banks 310a-b correspond respectively to even and odd sets of doubleword registers. That is, each of entries 315 in bank 310a corresponds to an even doubleword register D0, D2, . . . D30, while each of entries 315 in bank 310b corresponds to an odd doubleword register D1, D3, . . . D31. (In other embodiments, other numbers of registers and/or registers of other sizes may be supported while preserving the same general even/odd organization of banks 310a-b.)

Figure 4:
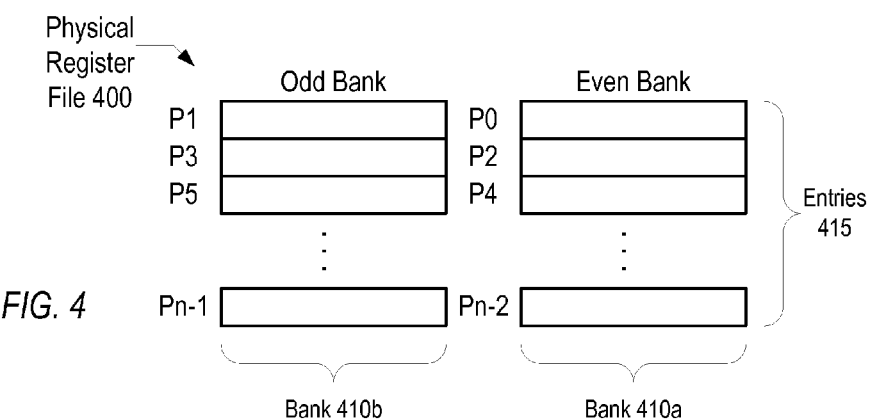
FIG. 4 is a block diagram illustrating an embodiment of a physical register file.

Prior to discussing the operation of renamer 300, an example organization of a physical register file that may be used in conjunction with renamer 300 is provided. FIG. 4 illustrates an embodiment of a physical register file 400, which may correspond to register file 22 of processor 10. In the illustrated embodiment, physical register file 400 is organized into two distinct banks 410a-b, each including a number of entries 415, each of which corresponds to a particular physical register. Physical register file 400 may implement an arbitrary number n of physical registers, each of which is denoted by a corresponding unique identifier denoted P0 through Pn−1. The number of physical registers may be greater than the number of architected registers.

In the illustrated embodiment, the bank configuration of physical register file 400 is similar to that of renamer 300. That is, each entry 415 of bank 410a corresponds to a respective even-numbered physical register P0, P2, . . . Pn−2, while each entry 415 of bank 410b corresponds to a respective odd-numbered physical register P1, P3, . . . Pn−1. Moreover, each entry 415 is of the same size as the architected register that corresponds to an entry 315 of renamer 300. That is, where renamer 300 is organized as banks 310a-b of doubleword register mappings, physical register file 400 similarly may be organized as banks 410a-b of doubleword registers.

In various embodiments, renamer 300 or another unit within processor 10 may implement a "free list" circuit that operates to track which physical registers are not actively being mapped by renamer 300, and thus are available (i.e., free) to be used for new mappings (e.g., for newly issued instructions). In some such embodiments, the free list circuit may also be organized to track physical register status on an odd and even basis. For example, one portion of the free list may be configured to monitor the status of those registers within bank 410a, while another portion may monitor bank 410b.

Figure 5:
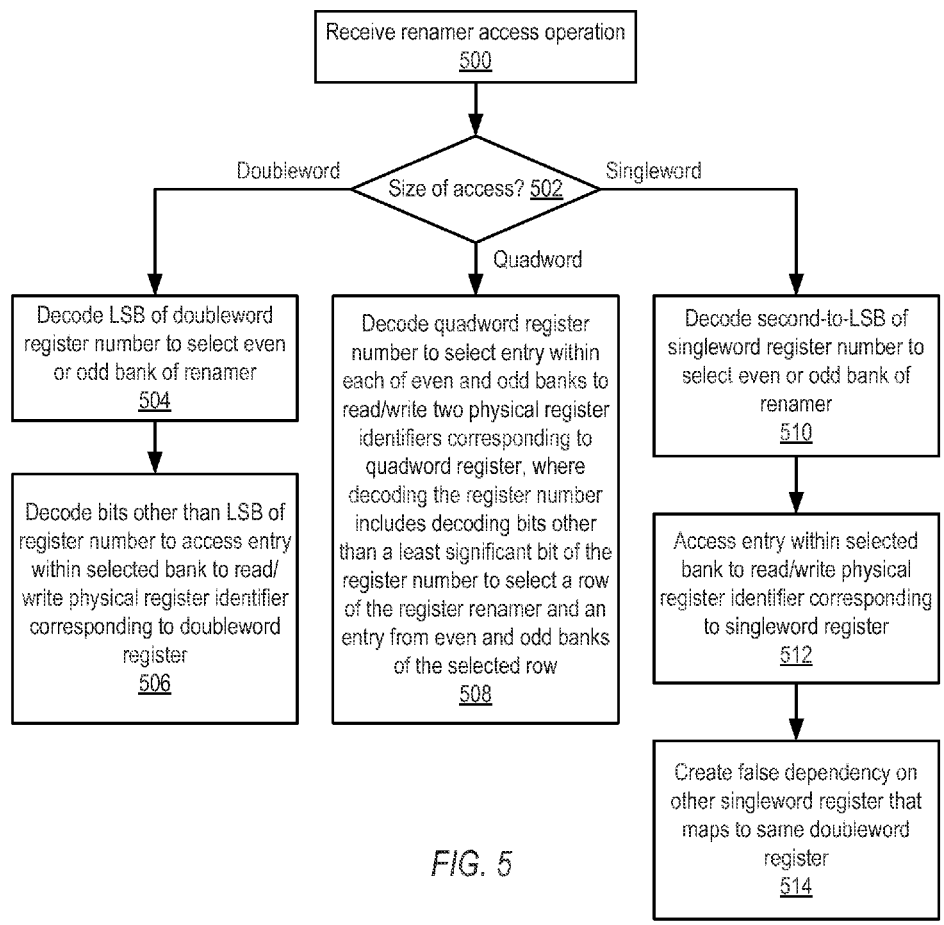
FIG. 5 is a flow chart illustrating operation of an embodiment of a register renamer.

FIG. 5 illustrates an embodiment of a method of operation of register renamer 300. Operation begins in block 500 where a renamer access operation is received. For example, the access operation may be a renamer read operation that provides a register number identifying an architected register (e.g., doubleword register D0, singleword register S6, quadword register Q12, etc.) and produces the identifier(s) of the physical register(s) to which the identified architected register is mapped. The access operation may also be a renamer write operation that also provides a register number of an architected register as well as the identifier(s) of the physical register(s) that should be stored within renamer 300 to create a new mapping for the architected register. As noted previously, in some embodiments, renamer 300 may support concurrent read and write operations.

The operation of renamer 300 varies according to the size of the architected register specified by the renamer access operation, which in the illustrated embodiment may be either a singleword, a doubleword, or a quadword (block 502). In response to determining that the renamer access operation is for a doubleword access, renamer 300 decodes the least significant bit of the doubleword register number to select either the even bank 310a or the odd bank 310b (block 504). For example, an access to D0 would select the even bank, whereas an access to D1 would select the odd bank within renamer 300.

A particular entry 315 within the selected bank of renamer 300 is then accessed to either read or write the physical register identifier that corresponds to the doubleword register number (block 506). For example, the bits other than the least significant bit of the doubleword register number may be decoded to select a particular entry 315 within the selected bank.

In response to determining that the renamer access operation is for a quadword access, renamer 300 decodes the quadword register number to select an entry 315 within both of the even and odd banks 310a-b to read or write the two physical register identifiers that correspond to the quadword register number (block 508). For example, the bits other than the least significant bit of the quadword register number may be decoded to select a particular row of entries 315, from which an entry from each of banks 310a-b is selected.

As illustrated in FIG. 4, in an embodiment of physical register file 400, each physical register is a doubleword register. Thus, two physical registers are needed when renaming a quadword architected register. In the embodiment shown in FIG. 5, the two physical register identifiers may be concatenated to form the renamed identifier for a quadword source or destination operand. For example, if register Q11 is mapped to physical registers P23 and P22, then an even entry of renamer 300 may store identifier P22, and the corresponding odd entry may store identifier P23. When renamer 300 is accessed with register number Q11, renamer 300 may output the concatenation of P23 and P22.

In response to determining that the renamer access operation is for a singleword access, renamer 300 decodes the second-to-least significant bit of the singleword register number to select either the even bank 310a or the odd bank 310b (block 510). For example, as shown in FIG. 2, registers S0 and S1 map to D0, whereas registers S2 and S3 map to D1. Correspondingly, the least significant bit of the singleword register number may be ignored, and the second-to-least significant bit of the singleword register number may specify the bank to be selected.

A particular entry 315 within the selected bank of renamer 300 is then accessed to either read or write the physical register identifier that corresponds to the singleword register number (block 512). For example, the bits other than the two least significant bits of the singleword register number may be decoded to select a particular entry 315 within the selected bank.

In the illustrated embodiment, a singleword architected register is mapped to a doubleword physical register. That is, when a singleword register number is provided to renamer 300, an entire entry 315 in either the even or odd bank of renamer 300 is selected, and this entry 315 contains an identifier of a particular doubleword physical register. However, as seen in FIG. 2, there are two singleword registers that correspond to each doubleword register. Thus, renaming one of the singleword registers of a given pair to a given physical register has the effect of renaming the other singleword register to the same physical register.

In the illustrated embodiment, to account for the relationship between singleword registers, when a particular singleword register is renamed, a false dependency is created on the other singleword register that also maps to the same physical register (block 514). For example, if register S0 is mapped to physical register P12, a false dependency will be created on register S1 as well. In various embodiments, the false dependency may cause producers or consumers of S1 to be treated as also being dependent on S0, and vice versa. For example, an instruction that reads S1 may be treated as dependent upon an instruction that writes S0, even though the instruction that writes S0 may not actually modify S1. Although such false dependencies may effectively reduce code parallelism, their use in the case of singlewords may simplify the design of renamer 300 and improve its performance in the case of doublewords, which may be the more frequent case.

It is noted that in some embodiments, when any particular singleword register is renamed, false dependencies may be created across all of the registers that map to the same physical register as the particular singleword register. For example, if register S0 is renamed, then instructions that read or write S1 may be treated as also being dependent on S0, and instructions that read or write S0 may be treated as also being dependent on S1. In certain embodiments, dependencies may not be tracked on a singleword level of granularity at all. Instead, a dependency vector or other type of data structure may be organized on the basis of doublewords, such that a read or write to any singleword register is treated as a read or write to its corresponding doubleword register. (That is, the singleword dependencies may be merged such that it is no longer possible to distinguish whether an instruction depends on a particular singleword.) Thus, for example, when a given instruction operates on either S0 or S1, the renamer entry for D0 may be consulted, and whichever instruction is the latest to modify either S0 or S1 (by writing to the physical register mapped to D0) may be designated a parent of the given instruction (e.g., an instruction on which the given instruction depends), for example by setting an appropriate bit in a dependency vector for the given instruction or by otherwise recording the dependency.

Figure 6:
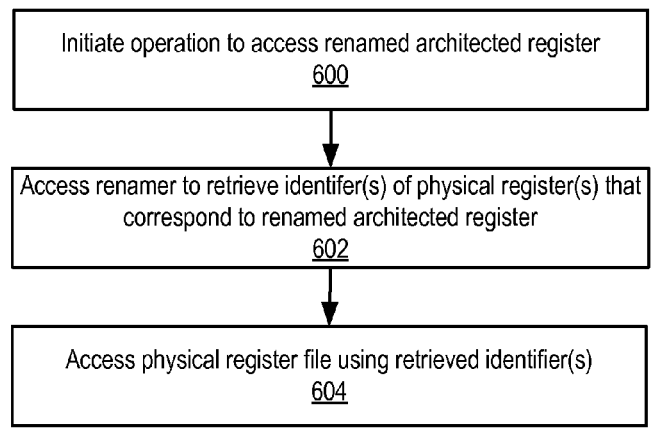
FIG. 6 is a flow chart illustrating operation of an embodiment of a processor to access a physical register that corresponds to a renamed architected register.

FIG. 6 illustrates a method of operation of processor 10 to access a physical register that corresponds to a renamed architected register. In the illustrated embodiment, operation begins at 600 where an operation to access a renamed architected register is initiated. For example, such an operation could correspond to the execution of an instruction that specifies an architected register as a source and/or a destination, although the various operations shown in FIG. 6 could be implemented by various different pipeline stages in various embodiments.

Register renamer 300 is then accessed to retrieve the identifier(s) of the physical register(s) that correspond to the renamed architected register (block 602). For example, as discussed above with respect to FIGS. 3-5, a register number that identifies the renamed architected register may be decoded to access one or more entries 315 of renamer 300, which may store physical register identifiers previously generated during the renaming of the architected register.

Using the physical register identifier(s), physical register file 400 is then accessed (block 604). For example, accessing renamer 300 may produce one or more physical register identifiers stored in entries 315. These may be provided to physical register file 400. Upon decoding, the identified physical registers may be read or written, as appropriate.

System and Computer Accessible Storage Medium

Figure 7:
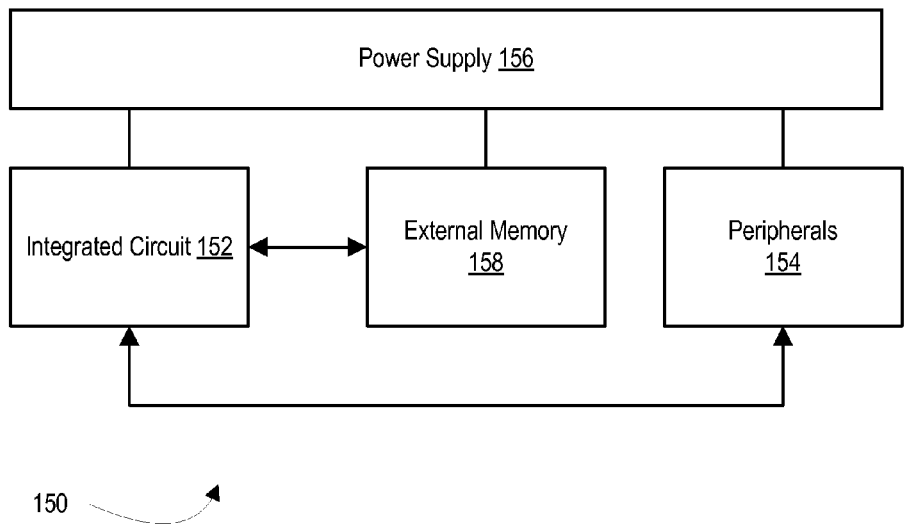
FIG. 7 is a block diagram illustrating an embodiment of a system.

Turning next to FIG. 7, a block diagram of an embodiment of a system 150 is shown. In the illustrated embodiment, the system 150 includes at least one instance of an integrated circuit 152. The integrated circuit 152 may include one or more instances of the processor 10 (from FIG. 1). The integrated 152 may, in an embodiment, be a system on a chip including one or more instances of the processor 10 and various other circuitry such as a memory controller, video and/or audio processing circuitry, on-chip peripherals and/or peripheral interfaces to couple to off-chip peripherals, etc. The integrated circuit 152 is coupled to one or more peripherals 154 and an external memory 158. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in an embodiment, the system 150 may be a mobile device (e.g. personal digital assistant (PDA), smart phone, etc.) and the peripherals 154 may include devices for various types of wireless communication, such as Wi-Fi, Bluetooth™, cellular, global positioning system (GPS), etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, "net top," etc.).

The external memory 158 may include any type of memory. For example, the external memory 158 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A processor that implements an instruction set architecture that aliases architected registers having different sizes, comprising:
    a physical register file comprising a plurality of physical registers configured to store data; and
    a register renamer distinct from the physical register file that, during operation, renames architected registers to corresponding physical registers, wherein the register renamer is organized into independently accessible even and odd banks, wherein the even bank and the odd bank each include a respective plurality of entries;
    wherein to rename a first architected register of a first size, the register renamer, during operation, stores an identifier of a first one of a pair of physical registers within an entry selected from the even bank, and stores an identifier of a second one of the pair of physical registers within an entry selected from the odd bank;
    wherein to rename a second architected register of a second size that is smaller than the first size, the register renamer, during operation, stores an identifier of one of the physical registers within an entry selected from either the even bank or the odd bank.

2. The processor of claim 1, wherein the first size corresponds to a quadword register size, and wherein the second size corresponds to a doubleword register size.

3. The processor of claim 1, wherein the first architected register has a corresponding register number expressed as a plurality of bits, and wherein to rename the first architected register, the register renamer, during operation, decodes bits other than a least significant bit of the register number to select an entry in each of the even and odd banks.

4. The processor of claim 1, wherein the second architected register has a corresponding register number expressed as a plurality of bits, and wherein to rename the second architected register, the register renamer, during operation, decodes a least significant bit of the register number to select a selected bank from either the even or the odd bank, and decodes bits other than a least significant bit of the register number to select an entry within the selected bank.

5. A method of operation of a processor that implements an instruction set architecture that aliases architected registers having different sizes, comprising:
    a register renamer renaming a first architected register of a first size, wherein the register renamer is organized into independently accessible even and odd banks, wherein the even bank and the odd bank each include a respective plurality of entries, and wherein renaming the first architected register comprises:
        the register renamer storing an identifier of a first one of a pair of physical registers of a physical register file within an entry selected from the even bank of the register renamer; and
        the register renamer storing an identifier of a second one of the pair of physical registers within an entry selected from the odd bank of the register renamer;
    the register renamer renaming a second architected register of a second size that is smaller than the first size, wherein renaming the second architected register comprises the register renamer storing an identifier of a physical register within an entry selected from either the even bank or the odd bank of the register renamer;
    wherein identifiers stored within entries of the register renamer are distinct from data stored within physical registers of the physical register file.

6. The method of claim 5, wherein the first size corresponds to a quadword register size, and wherein the second size corresponds to a doubleword register size.

7. The method of claim 5, wherein the first architected register has a corresponding register number expressed as a plurality of bits, and wherein renaming the first architected register further comprises the register renamer decoding bits other than a least significant bit of the register number to select an entry in each of the even and odd banks.

8. The method of claim 5, wherein the second architected register has a corresponding register number expressed as a plurality of bits, and wherein renaming the second architected register comprises the register renamer decoding a least significant bit of the register number to select a selected bank from either the even or the odd bank, and decoding bits other than a least significant bit of the register number to select an entry within the selected bank.

9. The processor of claim 1, wherein the register renamer comprises multiple ports configured such that, during operation, the register renamer concurrently accesses multiple different entries corresponding to multiple different architected registers.

10. The processor of claim 1, wherein the physical register file comprises an odd physical register bank corresponding to physical registers having odd-numbered identifiers and an even physical register bank corresponding to physical registers having even-numbered identifiers.

11. The processor of claim 1, wherein to access a given physical register corresponding to a renamed architected register, during operation, the register renamer retrieves one or more physical register identifiers corresponding to the renamed architected register, and the physical register file accesses the given physical register using the one or more physical register identifiers.

12. A system, comprising:
a memory that, during operation, stores instructions; and
at least one processor that implements an instruction set architecture that aliases architected registers having different sizes, the at least one processor comprising:
a physical register file comprising a plurality of physical registers; and
a register renamer distinct from the physical register file that, during operation, renames architected registers to corresponding physical registers, wherein the register renamer is organized into independently accessible even and odd banks, wherein the even bank and the odd bank each include a respective plurality of entries;
wherein to rename a first architected register of a first size, the register renamer, during operation, stores an identifier of a first one of a pair of physical registers within an entry selected from the even bank, and stores an identifier of a second one of the pair of physical registers within an entry selected from the odd bank;
wherein to rename a second architected register of a second size that is smaller than the first size, the register renamer, during operation, stores an identifier of one of the physical registers within an entry selected from either the even bank or the odd bank.

13. The system of claim 12, wherein the first size corresponds to a quadword register size, and wherein the second size corresponds to a doubleword register size.

14. The system of claim 12, wherein the first architected register has a corresponding register number expressed as a plurality of bits, and wherein to rename the first architected register, the register renamer, during operation, decodes bits other than a least significant bit of the register number to select an entry in each of the even and odd banks.

15. The system of claim 12, wherein the second architected register has a corresponding register number expressed as a plurality of bits, and wherein to rename the second architected register, the register renamer, during operation, decodes a least significant bit of the register number to select a selected bank from either the even or the odd bank, and decodes bits other than a least significant bit of the register number to select an entry within the selected bank.

16. The system of claim 12, wherein the register renamer comprises multiple ports configured such that, during operation, the register renamer concurrently accesses multiple different entries corresponding to multiple different architected registers.

17. The system of claim 12, wherein the physical register file comprises an odd physical register bank corresponding to physical registers having odd-numbered identifiers and an even physical register bank corresponding to physical registers having even-numbered identifiers.

18. The processor of claim 12, wherein to access a given physical register corresponding to a renamed architected register, during operation, the register renamer retrieves one or more physical register identifiers corresponding to the renamed architected register, and the physical register file accesses the given physical register using the one or more physical register identifiers.

* * * * *